June 6, 1939. P. CONRADSON 2,161,136
ATTACHED JACK FOR VEHICLES
Filed May 12, 1937 3 Sheets-Sheet 1
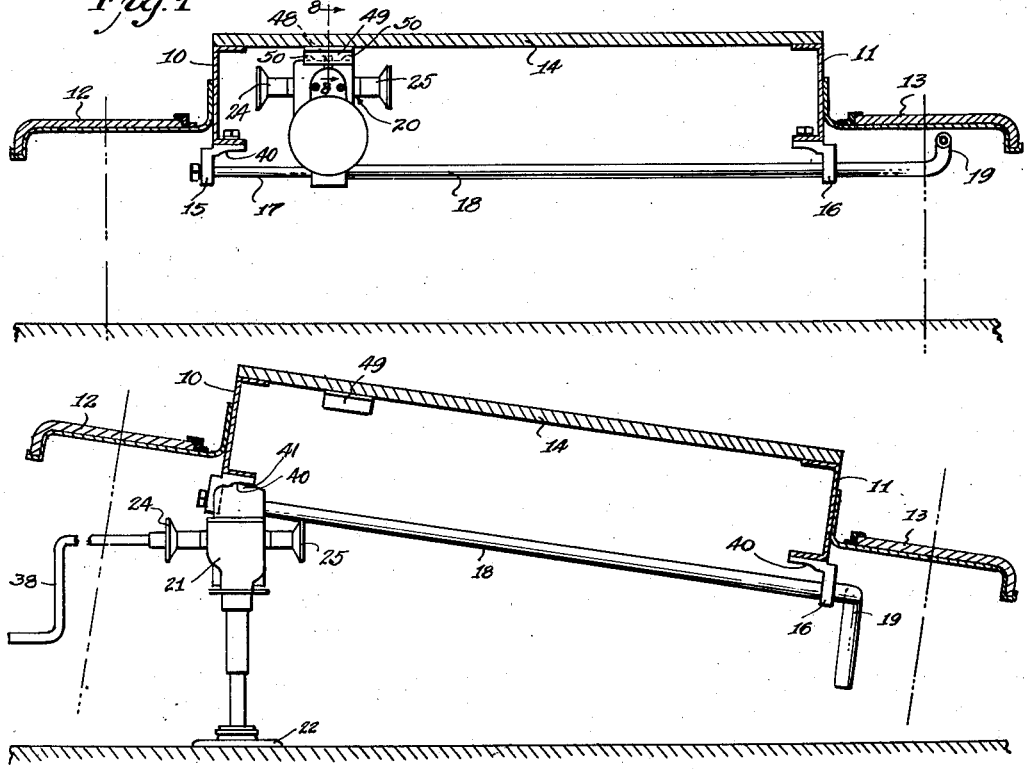
Fig. 1
Fig. 2
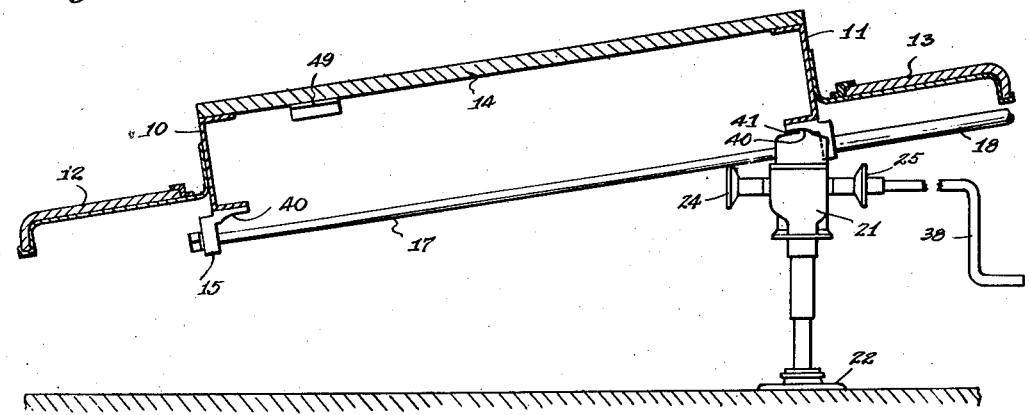
Fig. 3
INVENTOR.
Prentice Conradson
BY
Barnes, Kisselle, Laughlin & Raisch
ATTORNEYS June 6, 1939. P. CONRADSON 2,161,136
ATTACHED JACK FOR VEHICLES
Filed May 12, 1937 3 Sheets-Sheet 2
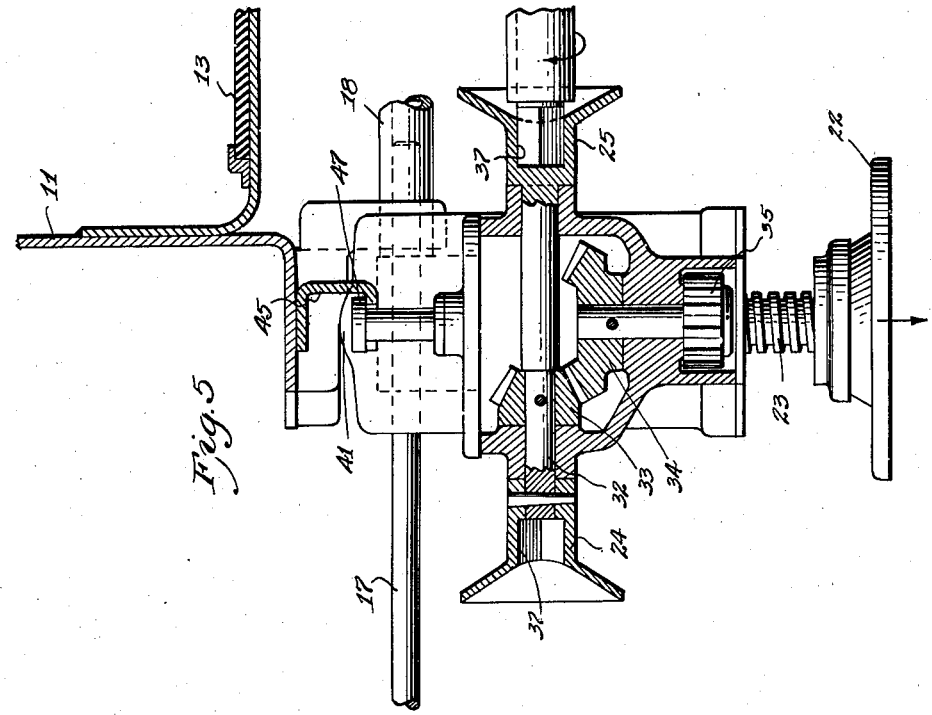
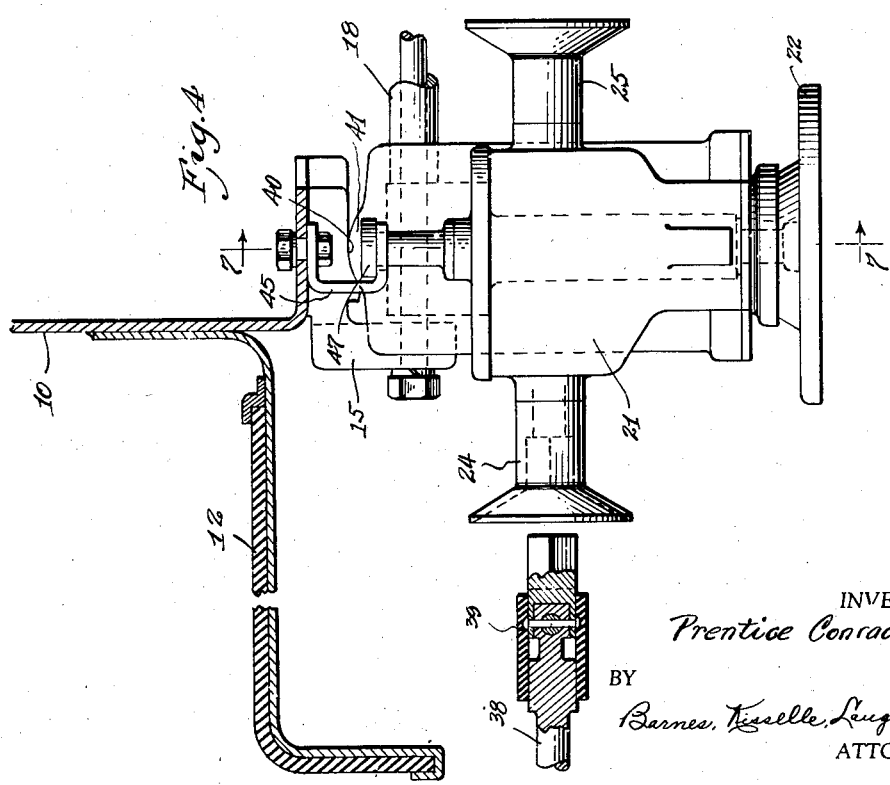
INVENTOR.
Prentice Conradson
BY
Barnes, Kisselle, Laughlin & Raisch
ATTORNEYS

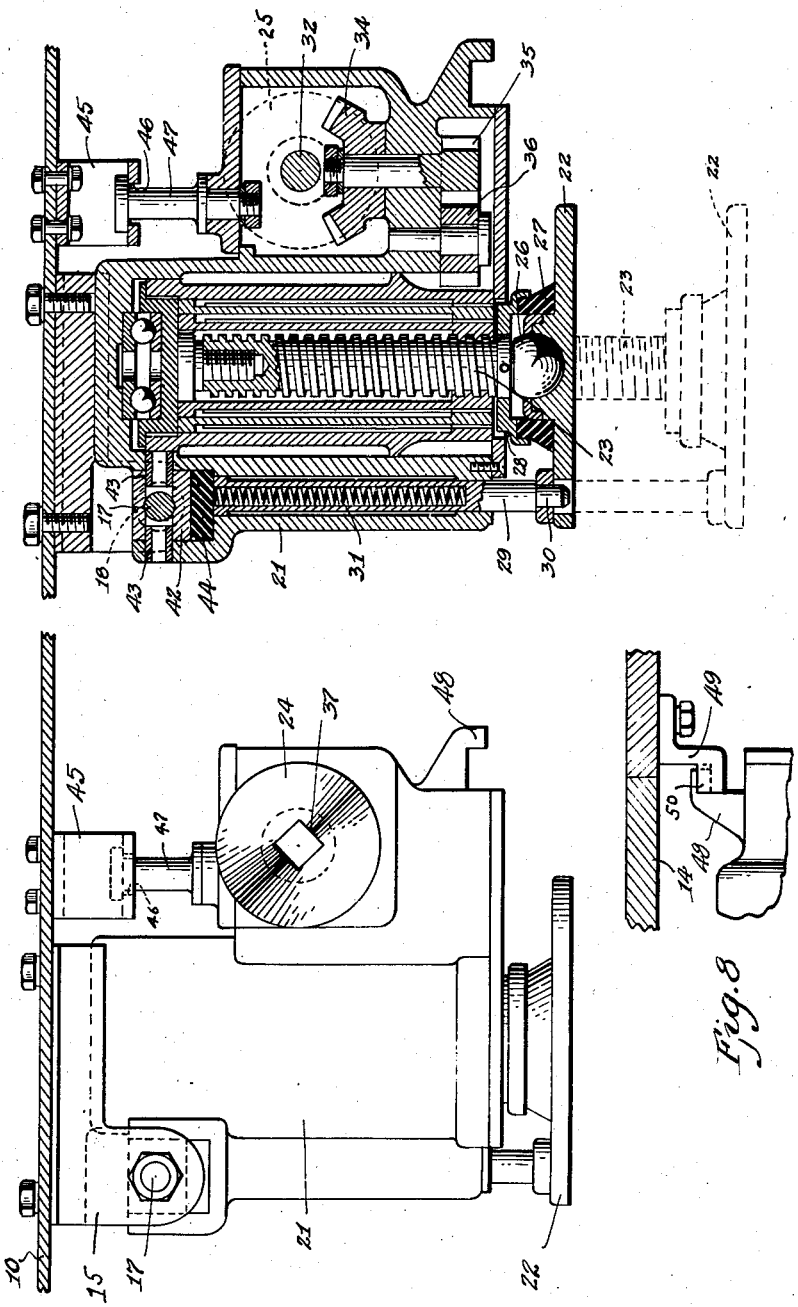

Patented June 6, 1939

2,161,136

UNITED STATES PATENT OFFICE 2,161,136

ATTACHED JACK FOR VEHICLES

Prentice Conradson, Evansville, Wis.

Application May 12, 1937, Serial No. 142,129

15 Claims. (Cl. 254—86)

This invention relates to an attached jack for vehicles, and more particularly to a jack to be permanently located on the frame of an automobile where it may be easily moved from storage to operative position.

There have been many attempts to design jacks for an automobile that could be permanently located on the lower portion of the vehicle and which could avoid the necessity and inconvenience of placing a jack under an automobile each time it was to be raised. For the most part this has been accomplished by permanently mounting four jacks, one at each corner of the vehicle, in such manner that any one of the jacks could be actuated to lift its particular corner of the vehicle.

An object of the present invention is to provide an automobile jack which is to be permanently located underneath the body and which is adapted to be carried when in inoperative position, in such manner that full road clearance is provided beneath the automobile.

A further object of the invention is to provide a jack for an automobile which is adapted to lift the entire side of the automobile and which can be conveniently shifted from one side of the automobile to the other depending on which side is to be raised. A further feature of this invention is the ease with which the jack can be actuated when in operative position.

Briefly the invention consists of a standard jack pivotally mounted on a slidable sleeve on the frame of an automobile in such manner that the jack may be pivoted from a horizontal storage position between the longitudinal frame members of the vehicle to vertical operative position thereby minimizing the actual required height of the jack. The sleeve is used to position the jack on one side of the vehicle or the other, and novel means are provided for mounting the jack on the frame to avoid strains when in use, and for locking the jack in its various positions.

In the drawings:

Fig. 1 illustrates the jack in storage position between the longitudinal frame members of a vehicle, the frame of which is shown in transverse cross section.

Fig. 2 shows the jack in operative position on one side of the vehicle.

Fig. 3 shows the jack in operative position on the other side of the vehicle.

Figs. 4, 5, 6 and 7 illustrate details of the jack construction and its mode of attachment to the frame of the vehicle.

Fig. 8 illustrates a locking device for the jack when in storage position.

Referring to Fig. 1 a transverse cross section of the chassis of a vehicle is shown in which members 10 and 11 are longitudinal frame members, and members 12 and 13 are running boards mounted on the respective frame members, the floor of the car is represented at 14. Rigidly attached to each of the frame members 10 and 11 are hangers 15 and 16 which are provided with downwardly extending portions serving as a support for a rod 17 and a sleeve 18 which extend between the frame members 10 and 11. The sleeve 18 is slidably mounted on the rod 17 through the hanger 16 and is provided at one end with a handle 19. The other end of the sleeve 18 is attached to a jack generally designated at 20 in a manner which will hereafter be described.

Referring to Figs. 4 to 7, the jack 20 consists generally of housing 21, a base plate 22 connected to a screw member 23 which, in turn, is operatively connected to crank sockets 24 and 25. The base plate 22 is connected to the screw member 23 with a ball and socket connection 26. A rubber collar 27 is fitted between the base plate 22 and a metal collar 28 to provide a cushion member between the screw 23 and the base plate 22. A base locking pin 29 is slidably mounted in the housing 21 having one end 30 inserted in the base plate 22 and the other end containing an expansible spring 31 which keeps the locking pin in contact with the base plate 22 until lifting has started and thereby prevents the base plate from turning.

The crank sockets 24 and 25 are rigidly connected to a shaft 32 which, when rotated, actuates the bevel gears 33 and 34 and pinions 35 and 36, the pinion 36 engaging a gearing of a standard telescoping multiple lift jack, the detail structure of which need not be explained. The sockets 24 and 25 are provided with openings 37 shaped to receive the end of a crank 38 having a swivel joint 39.

The hangers 15 and 16 are bolted to an inwardly extending flange of the frame members 10 and 11 and, as shown especially in Fig. 4, are provided with an arcuate longitudinally extending bearing surface 40. This bearing surface 40 is adapted to correspond in shape to a rounded bearing surface 41 on the housing 21 of the jack 20 so that the jack may move freely with respect to the hangers 15 and 16 when it is positioned under them. In order that the jack may assume a position at an angle to the rod 17 and the sleeve 18 when either side of the frame is lifted above the other, as shown especially in Figs. 2 and 3, a special mounting device is provided in the jack housing. As shown in cross section in Fig. 7, the rod 17 passes through the housing 21 and through a hinge block 42 which is pivotally mounted in housing 21 by hinge pins 43. The sleeve 18 is rigidly fastened to the hinge block 42 and a rubber shackle member 44 is positioned between the hinge block and the housing 21 to reduce the freedom of movement between the hinge and the jack and thereby facilitate positioning of the jack as it raises the car. It will be seen that if the rubber shackle member 44 were not provided, the jack would swing freely on the sleeve 18 before the base plate 22 was screwed to the ground and present difficulties in positioning the jack prior to lifting.

An aligning member 45 is also bolted to the frame members 10 and 11 and is provided with a slot 46 into which fits the shank of an upwardly extending bolt 47 on the jack housing. The jack housing is also provided with a latch member 48 which is adapted to engage a depending latch member 49 on the floor 14 of the vehicle (Fig. 8). As shown in Fig. 1, the latch member 49 is provided with lugs 50 which prevent the latch 48 from escaping when the jack is in storage position.

In the operation, assume that the jack is in stored position as shown in Fig. 1, with the latch member 48 engaging the latch member 49 to lock the jack in position. To release the jack into operative position the handle 19 is turned, to lift the latch 48 above the lugs 50, and is then pulled toward the right as viewed in Fig. 1. The sleeve 18 will move the jack away from the latch 49 and the jack will then freely swing downward on the sleeve 18 and may be positioned under the hanger 15 or the hanger 16 depending on which side of the car is to be raised. When the jack is, for example, positioned under the hanger 15, the bolt 47 will pass into the slot 46 of the aligning member 45 and position the jack solidly in place. The crank 38 may then be inserted into the crank socket 24 and turned until the base plate 22 strikes the concrete or earth underneath the vehicle. Further turning will raise the side of the vehicle under which the jack is positioned, the jack remaining in substantially vertical position and the frame assuming an angle thereto. During this lifting step the bearing surface 40 of the hanger 15 will rock on the bearing surface 41 of the jack, and the rod 17 and sleeve 18 will pivot with the hinge block 42 relative to the jack housing and against the rubber shackle 44 and thereby relieve any strain that otherwise might be placed on the jack housing and especially the cross rod sleeve and hangers. The jack after being retracted may be placed again in storage position by swinging the handle 19 until the latch member 48 is to the side of and above the member 49 and then sliding the jack toward the latch member 49 and releasing so that the latch 48 is gravity locked between the lugs 50.

What I claim is:

1. Jacking apparatus for a vehicle having a frame comprising an extensible jack and means for slidably and pivotally mounting said jack on said vehicle between longitudinal members of said frame whereby said jack may be shifted from a horizontal storage position to a vertical operative position at either side of said frame to lift either side of said vehicle.

2. Jacking apparatus for a vehicle having a frame with longitudinal side members comprising an extensible jack, detachable means for manually operating said jack, and sleeve and rod means extending transversely of the vehicle between the side members of said frame for slidably and pivotally mounting said jack on said vehicle whereby the jack may be pivoted from a horizontal storage position above the road clearance of the vehicle to vertical position, and slid to operative position on either side of said vehicle.

3. In a jacking apparatus for attaching to the frame of a vehicle, an extensible jack comprising a housing and an extensible member, means for operating said jack, bearing members on each side of said vehicle frame, track means supported between said bearing members, and means on said jack housing to pivotally and slidably mount said jack on said track means whereby said jack may be pivoted from a horizontal storage position above the road clearance of the vehicle to vertical position, and shifted to operative position in engagement with either of said bearing members whereby each side of said vehicle may be raised by said jack.

4. In a jacking apparatus for attaching to the frame of a vehicle, an extensible jack comprising a housing and an extension member, means in said housing and means on said frame for permanently mounting said jack to permit the jack to be manually shifted between the sides of said frame to vertical operative position on either side of said vehicle from a substantially horizontal position above the road clearance of said vehicle, said jack housing being pivotally mounted with respect to said frame to permit the jack to assume an angle with the plane of the frame as the vehicle is raised at one side.

5. In a jacking apparatus for attaching to the frame of a vehicle, an extensible jack comprising a housing and an extension member, means for operating said jack, track means extending transversely of and supported by the frame of the vehicle, means on said housing to pivotally and slidably mount said jack between the sides of the frame on said track means whereby said jack may be pivoted from a substantially horizontal storage position in the plane of said frame to vertical position, and slid to operative position on either side of said frame, and means on said housing to permit restricted pivotal movement of said jack in the vertical plane through said track means as the vehicle frame assumes an angle with the jack on being lifted at one side.

6. In a jacking apparatus for attaching to the frame of a vehicle, an extensible jack comprising a housing and an extension member, means for operating said jack, track means extending transversely of and supported by the frame of the vehicle, means on said housing to pivotally and slidably mount said jack on said track means whereby said jack may be pivoted from a substantially horizontal position in the plane of said frame to vertical position, and slid to operative position on either side of said frame, and a rubber shackle in said housing to permit restricted pivotal movement of said jack in the vertical plane through said track means as the vehicle frame assumes an angle with the jack when the frame is lifted at one side.

7. In a jacking apparatus for attaching to the frame of a vehicle, an extensible jack comprising a housing and an extension member, said housing having a substantially arcuate bearing portion, bearing members on opposite sides of said frame having bearing surfaces complementary to the bearing surface on said housing, sleeve means in said housing and transverse rod means on said frame for mounting said jack to permit the jack to be shifted to vertical operative position on either side of said vehicle without being removed therefrom, said bearing members being so located with respect to the means on said frame that the bearing surface of the housing and of one of the bearing members will contact when the jack is in operative position, said jack housing being pivotally mounted with respect to said frame on an axis perpendicular to said rod means to permit relative rocking movement between said contacting bearing surfaces as the jack assumes an angle with the plane of said frame when the vehicle is raised at one side.

8. In a jacking apparatus for attaching to the frame of a vehicle, an extensible jack comprising a housing, an extension member and means for operating said jack, a rod extending transversely of and rigidly attached to the vehicle frame, sleeve means adapted to rotatably and slidably fit around said rod, and a hinge block in said jack housing pivoted on an axis perpendicular to said rod and rigidly attached to said sleeve means, said block being provided with an aperture for said rod whereby said jack may be manually positioned on either side of said vehicle by the sliding of said sleeve on said rod.

9. In a jacking apparatus for attaching to the frame of a vehicle, an extensible jack comprising a housing, an extension member and means for operating said jack, a rod extending transversely of and rigidly attached to the vehicle frame, sleeve means adapted to slidably fit around said rod, a hinge block in said jack housing pivoted on an axis perpendicular to said rod and rigidly attached to said sleeve means, said block being provided with an aperture for said rod whereby said jack may be manually positioned on either side of said vehicle by the sliding of said sleeve on said rod, and shackle means between said hinge block and said housing to allow limited pivotal movement between said housing and said sleeve means.

10. In a jacking apparatus for attaching to the frame of a vehicle, an extensible jack comprising a housing and an extension member and means to actuate the same, a rod extending transversely of and rigidly atached to the vehicle frame, sleeve means rotatably and slidably mounted on said rod, and means pivotally mounting said sleeve means to said jack housing on an axis perpendicular to said rod whereby the jack may be manually shifted from vertical operative position on either side of the vehicle and pivoted to storage position substantially in the plane of said frame.

11. In a jacking apparatus for attaching to the frame of a vehicle, an extensible jack comprising a housing and an extension member and means to actuate the same, a rod extending transversely of and rigidly attached to the vehicle frame, sleeve means rotatably and slidably mounted on said rod, and means pivotally mounting said sleeve means to said jack housing on an axis perpendicular to said rod whereby the jack may be manually shifted from vertical operative position on either side of the vehicle and pivoted to storage position substantially in the plane of said frame, and locking means to lock said jack in storage position.

12. In a jacking apparatus for attaching to the frame of a vehicle, an extensible jack comprising a housing and an extension member and means to actuate the same, a rod extending transversely of and rigidly attached to the vehicle frame, sleeve means rotatably and slidably mounted on said rod, means pivotally mounting said sleeve means to said jack housing on an axis perpendicular to said rod whereby the jack may be manually shifted from vertical operative position on either side of the vehicle and pivoted to storage position substantially in the plane of said frame, and aligning means on said housing and said frame to hold said housing in vertical operative position.

13. In a jacking apparatus for attaching to the frame of a vehicle, an extensible jack comprising a housing and an extension member and means to actuate the same, a rod extending transversely of and rigidly attached to the vehicle frame, sleeve means rotatably and slidably mounted on said rod, and means pivotally mounting said sleeve means to said jack housing on an axis perpendicular to said rod whereby the jack may be manually shifted from vertical operative position on either side of the vehicle and pivoted to storage position substantially in the plane of said frame, locking means to secure said jack in storage position, and a bolt and slot device to align said housing and the vehicle frame to hold said housing in vertical operative position.

14. In a jacking apparatus for attaching to the frame of a vehicle, an extensible jack comprising a housing, an extension member, and means for operating said jack comprising handle sockets on opposite sides of said housing, a rod extending through said jack housing and positioned transverse of the vehicle frame, sleeve means adapted to slidably fit around said rod, a hinge block in said jack housing fastened to one end of said sleeve means and provided with an aperture for said rod, and a handle at the other end of said sleeve means whereby said jack may be manually positioned on either side of said vehicle by the sliding of said sleeve on said rod.

15. In a jacking apparatus for attaching to the frame of a vehicle, an extensible jack comprising a housing, an extension member, and means for operating said jack, a rod extending through said jack housing and positioned transverse of the vehicle frame, sleeve means adapted to slidably fit around said rod, a hinge block in said jack housing fastened to one end of said sleeve means and provided with an aperture for said rod, and a handle at the other end of said sleeve means whereby said jack may be manually positioned on either side of said vehicle by the sliding of said sleeve on said rod.

PRENTICE CONRADSON.